United States Patent
Simpson et al.

(10) Patent No.: US 7,234,001 B2
(45) Date of Patent: Jun. 19, 2007

(54) DORMANT BACKUP LINK FOR OSPF NETWORK PROTECTION

(75) Inventors: Valerie A. Simpson, Stittsville (CA); Dwight D. Jamieson, Ottawa (CA); Nevein T. Sultan, Ottawa (CA)

(73) Assignee: Nortel Networks Limited, St. Laurent, QC (CA)

( * ) Notice: Subject to any disclaimer, the term of this patent is extended or adjusted under 35 U.S.C. 154(b) by 1179 days.

(21) Appl. No.: 09/739,902

(22) Filed: Dec. 20, 2000

(65) Prior Publication Data

US 2002/0078232 A1   Jun. 20, 2002

(51) Int. Cl.
*G06F 13/00* (2006.01)
(52) U.S. Cl. .................................... 709/239
(58) Field of Classification Search ............... 370/228; 709/238, 239
See application file for complete search history.

(56) References Cited

U.S. PATENT DOCUMENTS

| | | | | |
|---|---|---|---|---|
| 5,959,972 A * | 9/1999 | Hamami | .................... | 370/228 |
| 6,055,561 A * | 4/2000 | Feldman et al. | ............ | 709/200 |
| 6,141,319 A * | 10/2000 | Dighe et al. | ................ | 370/218 |
| 6,222,821 B1 * | 4/2001 | Sees et al. | ................... | 370/227 |
| 6,363,319 B1 * | 3/2002 | Hsu | ........................... | 701/202 |
| 6,473,421 B1 * | 10/2002 | Tappan | ...................... | 370/351 |
| 6,556,547 B1 * | 4/2003 | Srikanth et al. | ............ | 370/317 |
| 6,594,268 B1 * | 7/2003 | Aukia et al. | ................ | 370/400 |
| 6,721,269 B2 * | 4/2004 | Cao et al. | ................... | 370/227 |
| 6,856,627 B2 * | 2/2005 | Saleh et al. | .................. | 370/397 |
| 6,963,575 B1 * | 11/2005 | Sistanizadeh et al. | ....... | 370/404 |
| 2002/0093954 A1 * | 7/2002 | Weil et al. | ................... | 370/389 |
| 2002/0163884 A1 * | 11/2002 | Peles et al. | ................. | 370/229 |
| 2002/0167898 A1 * | 11/2002 | Thang et al. | ............... | 370/216 |
| 2003/0165117 A1 * | 9/2003 | Garcia-Luna-Aceves et al. | ........................ | 370/238 |

OTHER PUBLICATIONS

International Search Report issued against corresponding International PCT Application No. PCT/CA01/01826, filed Dec. 20, 2001.

* cited by examiner

*Primary Examiner*—Kenneth R. Coulter
(74) *Attorney, Agent, or Firm*—Kent Daniels; Ogilvy Renault LLP

(57) ABSTRACT

A method and apparatus provides protection against resource failures in Open Shortest Path First (OSPF) networks, without increasing the complexity of the network topology and/or management. An internal router (IR) automatically maintains a back-up link in a dormant state until a network failure affecting communications with a primary adjacent area border router (ABR) is detected. Upon detection of the network failure, the IR activates the back-up link in order to enable traffic flow to an alternate adjacent ABR, which by-passes the network failure. Upon recovery of communications with the primary adjacent ABR, the IR automatically deactivates the back-up link and resumes traffic flow through the primary adjacent ABR. As a result, traffic is forwarded into the back-up link only when communications with the primary adjacent ABR has failed, thereby maintaining simplicity in the network topology, and minimizing network management and administration requirements.

20 Claims, 2 Drawing Sheets

DORMANT BACKUP LINK FOR OSPF NETWORK PROTECTION

CROSS-REFERENCE TO RELATED APPLICATIONS

This is the first application filed for the present invention.

MICROFICHE APPENDIX

Not Applicable.

TECHNICAL FIELD

The present invention relates to routing protocols for connectionless traffic in a data network, and in particular to a backup interface for providing protection against resource failures in Open Shortest Path First (OSPF) networks.

BACKGROUND OF THE INVENTION

The modern data network space includes a plurality of federated domains, or areas, that are interconnected by a backbone network. FIG. 1 is a block diagram showing a typical network 2 having two areas 4 (Area 0.0.0.1 and Area 0.0.0.2) that are linked to a backbone network 6 via one or more respective Area Border Routers (ABRs) 8. Each area 4 includes one or more internal routers (IRs) 10, which control the forwarding of traffic among user machines 12 (e.g. PCs) and respective ABRs 8 hosting the area 4. Each of the routers 8,10 are coupled together via links 14 (which may be physical or logical links) through which packetized data is forwarded. Thus within area 0.0.0.1, traffic flows between ABR(A) 8*a*, and user machines 12 within area 0.0.0.1 are routed through IR(A) 10*a* via an intervening link 14*a*. Similarly, within area 0.0.0.2, traffic flows between ABR(B) 8*b*, and user machines 12 within area 0.0.0.2 are routed through IR(B) 10*b* via an intervening link 14*b*.

The topology of the network 2 illustrated in FIG. 1 is typical of that set up within an enterprise or campus Local Area Network (LAN) to connect various domains (e.g. departmental LANs) represented by each area 4 to one another (and possibly to an external network such as the public internet, not shown). Typically, traffic forwarding within such a network 2 is controlled using an interior gateway protocol (IGP) such as Open Shortest Path First (OSPF).

The topology of FIG. 1 is vulnerable to resource failures affecting traffic flows between an area 4 and the backbone 6. In particular, in an event of failure of either ABR(A) 8 or the link 14*a* between IR(A) 10*a* and ABR(A) 8*a*, traffic flow between user machines 12 in area 0.0.0.1 and the backbone 6 (and thus also area 0.0.0.2) will be interrupted. Similarly, in an event of failure of either ABR(B) 8*b*, or the link 14*b* between IR(B) 10*b* and ABR(B) 8*b*, traffic flow between user machines 12 hosted by area 0.0.0.2 and the backbone 6 will be interrupted. One way of overcoming this vulnerability is to install back-up links 16 (shown in dashed lines) between IR(A) 10*a* and ABR(B) 8*b*, and between IR(B) 10*b* and ABR(A) 8*a*. In principle, the installation of such back-up links 16 in this manner can provide an alternate path for traffic flows between areas 0.0.0.1 and 0.0.0.2 and the backbone 6 in an event of failure of either one of ABR(A) 8*a* or ABR(B) 8*b*.

However, under the OSPF protocol, the provisioning of a new link triggers conventional OSPF flooding of link State Advertisement (LSA) messages advertising the new link to adjacent routers. Once advertised, the new link becomes available for carrying traffic. This advertisement behavior inevitably results in each of the back-up links 16 being advertised to the network 2, and subsequently carrying data traffic, even when the ABRs 8 are operating normally. The amount of traffic flowing in these back-up links 16 may be reduced somewhat by manipulating the metrics assigned to these links 16. However, this typically requires manual intervention, which increases network management effort. Furthermore, the installation of back-up links 16 has the effect of making ABR(B) 8*b* part of area 0.0.0.1, and ABR(A) 8*a* part of area 0.0.0.2. Consequently, conventional OSPF will result in these routes being favored for inter-area traffic (e.g. traffic originating in area 0.0.0.1 and destined for area 0.0.0.2), regardless of the metrics assigned to each of the back-up links 16. In addition, because IR(A) 10*a* can forward traffic destined for area 0.0.0.2 directly through ABR(B) 8*b* (thereby bypassing ABR(A) 8*a*) the implementation of policies respecting the forwarding of traffic between areas 0.0.0.1 and 0.0.0.2 is made significantly more complicated. Thus, the insertion of back-up links 16 in this manner tends to increase the complexity of the network topology, and complicates network management and administration.

Accordingly, a method and apparatus for providing protection against resource failures in Open Shortest Path First (OSPF) networks, without increasing the complexity of the network topology and/or management, remains highly desirable.

SUMMARY OF THE INVENTION

An object of the present invention is to provide an efficient method of protecting an Open Shortest Path First (OSPF) network against resource failures, in which increased complexity of the physical network topology and/or management is avoided.

Accordingly, an aspect of the present invention provides a method of protecting an Open Shortest Path First (OSPF) network against network failures affecting traffic flow between an interior router (IR) and a predetermined primary area border router (ABR) using a back-up link between the IR and a predetermined alternate ABR. The back-up link is maintained in a dormant state during normal operations of the network, such that no traffic is forwarded to the back-up link during normal operations of the network. The back-up link is activated in response to a network failure affecting communications between the IR and the primary ABR, such that traffic can be routed between the IR and the alternate ABR through the back-up link.

In some embodiments of the invention, the back-up link is maintained in a dormant state by assigning a backup interface type attribute to the back-up link. Each of the IR and the alternate ABR can then be controlled such that: information respecting the back-up link is not advertised to adjacent routers; and the back-up link is not identified as a valid route in respective forwarding tables of each of the IR and the alternate ABR.

The back-up link may be activated by detecting the network failure affecting communications between the IR and the primary ABR; promoting the back-up link to an active status; and advertising the back-up link as a valid route.

Preferably, the network failure is detected by the IR. Similarly, promotion of the back-up link to an active status is preferably initiated by the IR.

In some embodiments of the invention, detection of the network failure comprises detecting a loss of communications between the IR and the primary ABR. A link between the IR and the primary ABR is then monitored for a predetermined period, to detect recovery of communications. A link failure is declared if recovery of communications between the IR and the primary ABR is not detected within the predetermined period.

In some embodiments, promotion of the back-up link comprises negotiating an adjacency relationship between the IR and the alternate ABR.

In some embodiments of the invention, the back-up link is deactivated in response to a network recovery affecting communications between the IR and the primary ABR, such that traffic flow through the back-up link between the IR and the alternate ABR is terminated. Deactivation of the back-up link may include detecting the network recovery; and demoting the back-up link to an inactive status.

Preferably, the network recovery is detected by the IR. Similarly, deactivation of the back-up link is preferably initiated by the IR.

In some embodiments, detection of the network recovery includes detecting a recovery of communications between the IR and the primary ABR. A link between the IR and the primary ABR is then monitored for a predetermined period, to detect loss of communications. Finally, a link recovery is declared if loss of communications between the IR and the primary ABR is not detected within the predetermined period.

In some embodiments, demotion of the back-up link includes terminating an adjacency relationship between the IR and the alternate ABR.

Another aspect of the present invention provides a router adapted for protecting an Open Shortest Path First (OSPF) network against network failures affecting communications with a predetermined adjacent router using a back-up link to a predetermined alternate router. The router includes: means for maintaining the back-up link in a dormant state during normal operations of the network, such that no traffic is forwarded to the back-up link during normal operations of the network; and means for activating the back-up link in response to a network failure affecting communications with the primary router, such that traffic can be routed through the back-up link.

In embodiments of the invention, the back-up link is provisioned with a back-up interface type attribute.

In some embodiments, the means for maintaining the back-up link in a dormant state includes means responsive to the assigned backup interface type attribute for controlling the router such that: information respecting the back-up link is not advertised to adjacent routers of the network; and the back-up link is not identified as a valid route in a respective forwarding table of the router.

In some embodiments, the means for activating the back-up link comprises: means for detecting the network failure affecting communications with the primary adjacent router; means for promoting the back-up link to an active status; and means for advertising the back-up link as a valid route. The means for detecting the network failure may include: means for detecting a loss of communications with the primary adjacent router; means for monitoring a link to the primary adjacent router for a predetermined period, to detect recovery of communications; and means for declaring a link failure if recovery of communications with the primary adjacent router is not detected within the predetermined period. The means for promoting the back-up link may include: means for activating the back-up link; and means for negotiating an adjacency relationship with the alternate router through the activated back-up link.

In some embodiments of the invention, the router includes means for deactivating the back-up link in response to a network recovery affecting communications with the primary adjacent router, such that traffic flow with the alternate router through the back-up link is terminated. The means for deactivating the back-up link may include: means for detecting the network recovery; and means for demoting the back-up link to an inactive status. The means for detecting the network recovery may include: means for detecting a recovery of communications with the primary adjacent router; means for monitoring a link to the primary adjacent router for a predetermined period, to detect loss of communications; and means for declaring a link recovery if loss of communications with the primary adjacent router is not detected within the predetermined period. The means for demoting the back-up link may include means for terminating an adjacency relationship with the alternate adjacent router.

A further aspect of the present invention provides a software program adapted to control a router of an Open Shortest Path First (OSPF) network to protect against network failures affecting communications with a predetermined primary adjacent router using a back-up link to a predetermined alternate router. The software program includes software adapted to control the router to maintain the back-up link in a dormant state during normal operations of the network, such that no traffic is forwarded to the back-up link during normal operations of the network; and software adapted to control the router to activate the back-up link in response to a network failure affecting communications with the primary router, such that traffic can be routed through the back-up link.

In some embodiments of the invention the back-up link is provisioned with a back-up interface type attribute. In such cases, the software adapted to control the router to maintain the back-up link in a dormant state comprises software responsive to the assigned backup interface type attribute for controlling the router such that: information respecting the back-up link is not advertised to adjacent routers; and the back-up link is not identified as a valid route in a respective forwarding table of the router.

In some embodiments, the software adapted to control the router to activate the back-up link includes: software adapted to control the router to detect the network failure affecting communications with the primary adjacent router; software adapted to control the router to promote the back-up link to an active status; and software adapted to control the router to advertise the back-up link as a valid route.

The software adapted to control the router to detect the network failure may include: software adapted to control the router to detect a loss of communications with the primary adjacent router; software adapted to control the router to monitor a link to the primary adjacent router for a predetermined period, to detect recovery of communications; and software adapted to control the router to declare a link failure if recovery of communications with the primary adjacent router is not detected within the predetermined period.

The software adapted to control the router to promote the back-up link may include: software adapted to control the router to control the router to negotiate an adjacency relationship with the alternate router.

In some embodiments of the invention, the software program further includes software adapted to control the router to deactivate the back-up link in response to a network recovery affecting communications with the primary adjacent router, such that traffic flow with the alternate router through the back-up link is terminated. The software adapted to control the router to deactivate the back-up link may include: software adapted to control the router to detect the network recovery; and software adapted to control the router to demote the back-up link to an inactive status. The software adapted to control the router to detect the network recovery may include: software adapted to control the router to detect a recovery of communications with the primary adjacent router; software adapted to control the router to monitor a link to the primary adjacent router for a predetermined period, to detect loss of communications; and software adapted to control the router to declare a link recovery if loss of communications with the primary adjacent router is not detected within the predetermined period.

The software adapted to control the router to demote the back-up link may include software adapted to control the router to terminate an adjacency relationship with the alternate adjacent router.

Thus the present invention provides a method and apparatus for providing protection against resource failures in Open Shortest Path First (OSPF) networks, without increasing the complexity of the network topology and/or management. An IR automatically maintains the back-up link in a dormant state until a network failure affecting communications with a primary adjacent ABR is detected. Upon detection of the network failure, the IR activates the back-up link in order to enable traffic flow which by-passes the network failure. Upon recovery of communications with the primary adjacent ABR, the IR automatically deactivates the back-up link and resumes traffic flow through the primary adjacent ABR. As a result, traffic is forwarded into the back-up link only when communications with the primary adjacent ABR has failed, thereby maintaining simplicity in the network topology, and minimizing network management and administration requirements.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
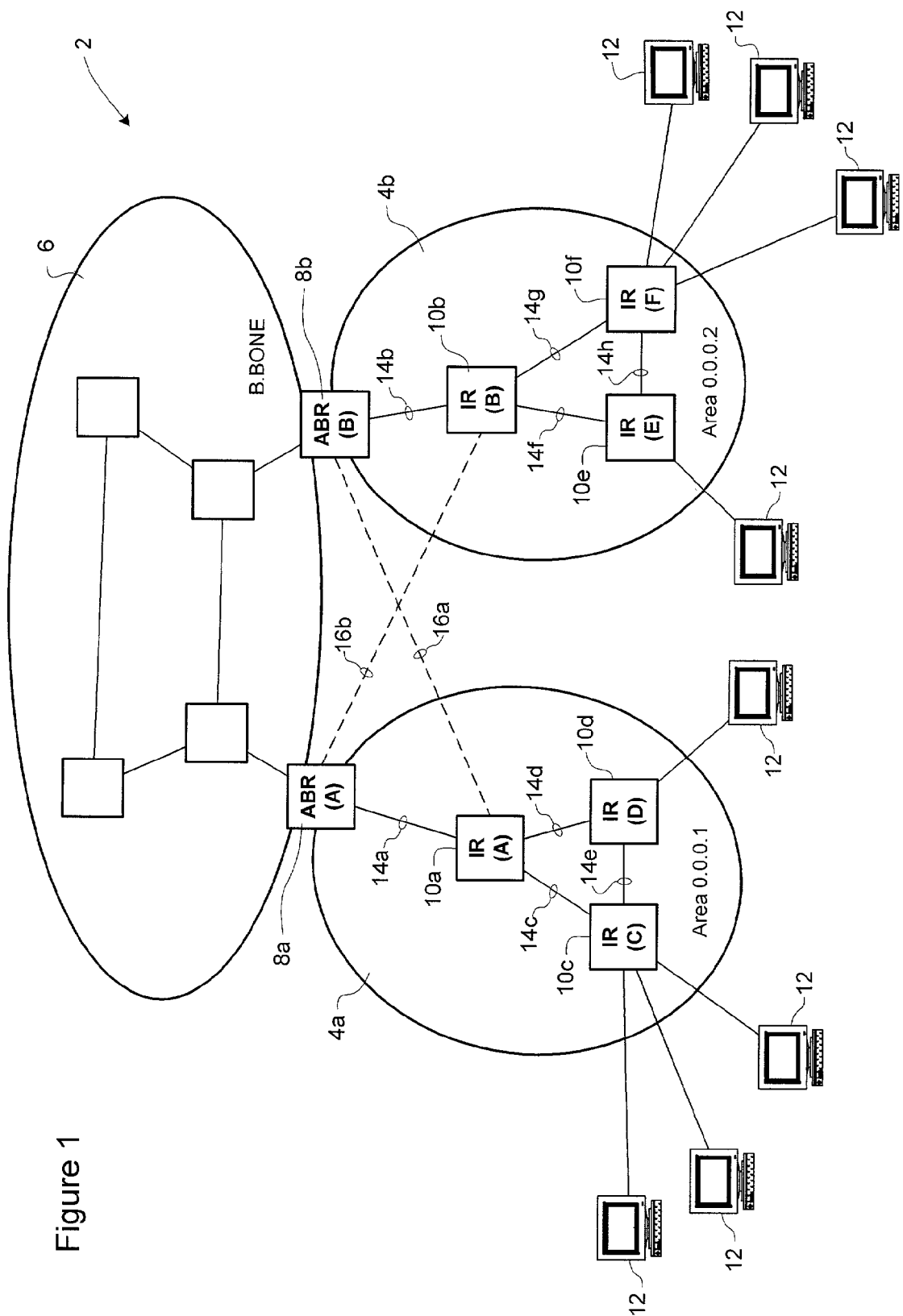
FIG. 1 is a block diagram schematically illustrating a network in which the present invention may be utilized.

The present invention provides a method of protecting an Open Shortest Path First (OSPF) network against resource failures. FIG. 1 illustrates an exemplary network 2 in which the present invention may be deployed. In the embodiment of FIG. 1, the network 2 includes two areas 4 (Area 0.0.0.1 4a and Area 0.0.0.2 4b) that are linked to a backbone network 6 via one or more respective Area Border Routers (ABRs) 8a,8b. Each area 4 includes one or more internal routers (IRs) 10, which control the forwarding of traffic among user machines (e.g. PCs 12) and the ABRs 8 hosting the area 4. The routers 8,10 are coupled together by links 14 (which may be physical or logical links) through which packetized data is forwarded. Thus within area 0.0.0.1 4a, traffic flows between ABR(A) 8a and user machines 12 within that area 4a are routed through IR(A) 10a via link 14a. Similarly, within area 0.0.0.2 4b, traffic flows between ABR(B) 8b and user machines within that area are routed through IR(B) 10b via link 14b.

In the embodiment of FIG. 1, two areas 4 are illustrated. Each of these areas 4 are connected to the backbone 6 via a single respective ABR 8, namely: ABR(A) 8a, which connects area 0.0.0.1 4a to the backbone 6, and ABR(B) 8b, which connects area 0.0.0.2 4b to the backbone 6. It will be appreciated, however, that the present invention may be successfully deployed in networks 2 having any number of areas 4, each of which may be coupled to the backbone 6 through one or more respective ABRs 8. Accordingly, the network 2 of FIG. 1 shall be viewed as being illustrative, rather than limitative, of the types of networks in which the present invention may be deployed.

Figure 2:
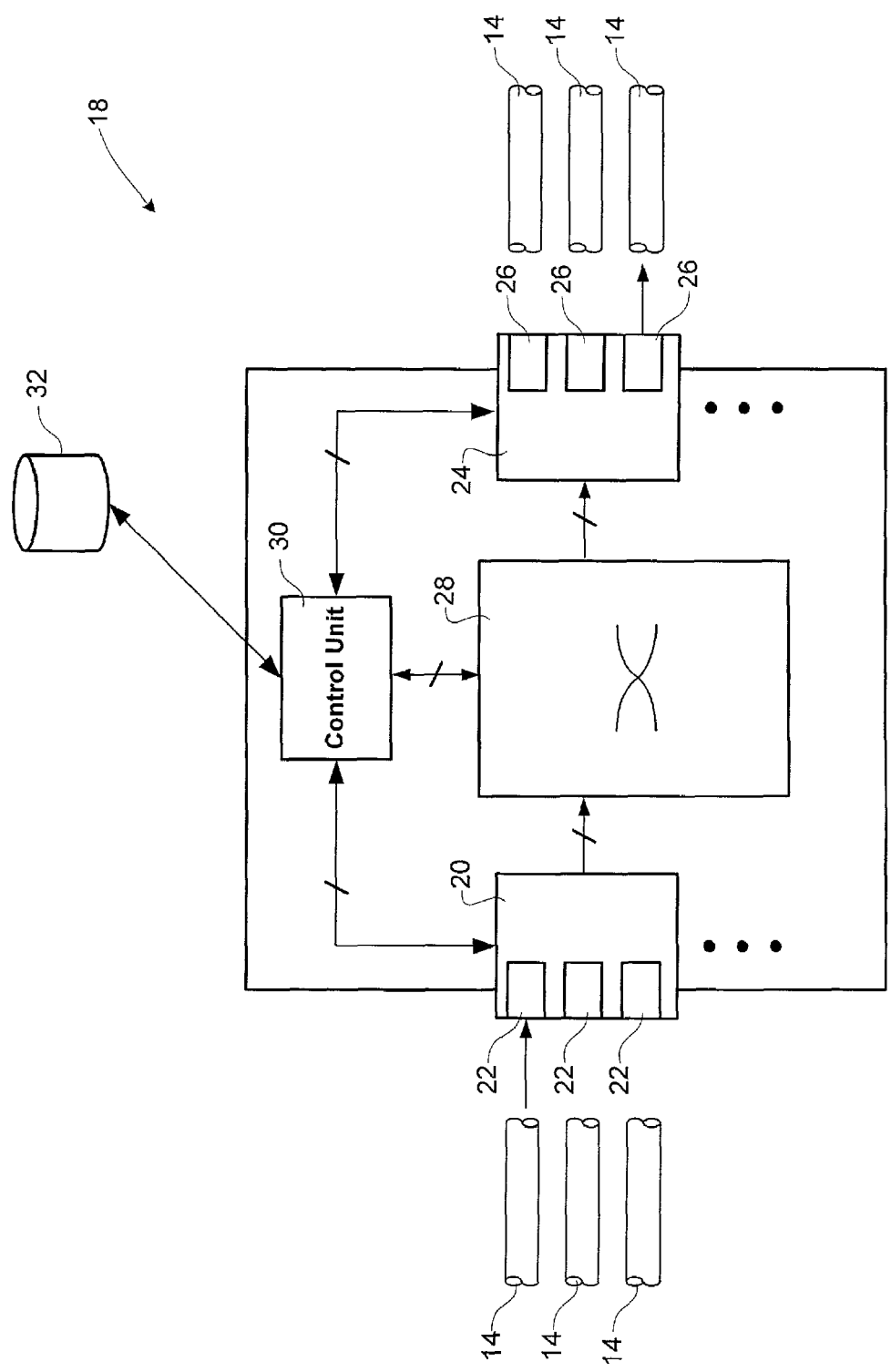
FIG. 2 is a block diagram schematically illustrating exemplary elements of a router in accordance with the present invention.

FIG. 2 is a block diagram schematically illustrating elements of an exemplary router 18 in accordance with the present invention. The router 18 may be deployed as any ABR 8, or IR 10, and operates to control the forwarding of traffic through the network 2. As shown in FIG. 2, the router 18 generally comprises at least one ingress network interface 20, each of which provides one or more ingress ports 22 for receiving data traffic through upstream links 14 of the network 2; at least one egress network interface 24, each of which provides a plurality of egress ports 26 for launching data traffic into downstream links 14 of the network 2; a switch fabric 28 for mapping traffic received at an ingress port 22 to a selected egress port 26 for forwarding to an appropriate downstream link 14; and a control unit 30 for controlling operations of the ingress and egress interfaces 20,24 and ports 22,26 and the switch fabric 28.

The router 18 may be implemented as physical hardware or as a virtual router instantiated in a server (not shown), for example. similarly, the ingress and egress interfaces 20,24 and ports 22,26, switch fabric 28, and the control unit 30 may be implemented by any suitable combination of hardware and/or software. In order to simplify illustration and description of the present invention, FIG. 2 shows only one each ingress and egress interface 20,24, each of which provides three respective ports 22,26. However, it will be understood that, in general, a router 18 will include multiple ingress and egress interfaces 20,24, and each interface will provide multiple ports 22,26. Similarly, in order to simplify description, a unidirectional traffic flow is illustrated within the router 18. Thus inbound data traffic is received through an upstream link 14 by an ingress port 22, mapped through the switch fabric 28 to an egress interface 24, and then launched into a downstream link 14 through an egress port. It will be appreciated, however, that traffic flows will, in general, be bi-directional. Accordingly, the router 18 of FIG. 2 shall be viewed as being illustrative, rather than limitative, of routers in accordance with the present invention.

The control unit 30 is logically connected to a database 32, which contains one or more forwarding tables, translation tables, policies, and/or any other information used for enabling flow-specific processing of data traffic through the router 18. The database 32 may be co-resident with the router 18, or remotely located and accessible by the router 18 through the network 2. As is known in the art, the control unit 30 operates, typically under software control, to recalculate OSPF routes and update the contents of the database 32 (principally the forwarding table), based on the contents of link state advertisement (LSA) messages advertised by other routers 18. LSA messages typically contain information identifying the current state of each active link connected to the router 18. Thus the inactive status of a failed link is indicated (by implication) by the absence of any information concerning the failed link in the LSA. Upon reception of an LSA, a router recalculates OSPF routes and updates its respective database 32. Because the LSA contains only information concerning active links, updating of the database 32 in this manner automatically purges the database 32 of information concerning failed (or otherwise invalid) links. Subsequently, as data packets are received at an ingress port 22, the contents of the packet header (e.g. the destination address) are read by the ingress interface 20 and used to query the database 32 in order to determine how the packet should be routed. Based on the query result, the control unit 30 interacts with the ingress interface 20, switch fabric 28, and/or the egress interface 24 to either forward the packet to an appropriate downstream link 14 or, under some conditions, to discard the packet.

The control unit 30 and ingress and egress interfaces 22,24 also operate in a known manner to detect the state of each link 14 connected to the router 18. In accordance with the conventional OSPF protocol, any detected changes in the state of a link 14 are advertised to every adjacent router 18 in a link state message (LSA) that is flooded into the network (i.e. launched into every operational link 14) by the router 18. Thus, for example, IR(A) 10*a* can detect a failure of ABR(A) 8*a* (or the link 14*a* between IR(A) 10*a* and ABR(A) 8*a*), and will flood LSAs to each of the other routers 18 (i.e. IR(C) 10*c* and IR(D) 10*d*) within area 0.0.0.1, in which information respecting the failed (or invalid) link to ABR(A) 8*a* is not included in the list of active interfaces. Similarly, IR(B) 10*b* can detect a failure of ABR(B) 8*b* (or the link 14*b* between IR(B) 10*b* and ABR(B) 8*b*), and will flood LSAs to other routers 18 (i.e. IR(E) 10*e* and IR(F) 10*f*) within area 0.0.0.2, in which information respecting the failed (or invalid) link to ABR(B) 8*b* is not included in the list of active interfaces.

The present invention provides efficient redirection of traffic in the event of resource failures, by providing backup links 16 which remain dormant during normal operations of the network 2, but which can be activated by an internal router 10 in the event of a network resource failure. In general, this can be accomplished by defining a Backup interface type, which can be assigned as an attribute of any (physical or logical) link 14 connected to a router 18. The control unit 30 of the router 18 can then operate under software control such that any links 14 having the Backup type attribute are neither advertised to adjacent routers 18 nor used in the calculation of OSPF routes, except in the event of a network failure affecting a primary resource (i.e. a resource that is active during normal operation of the network 2). As a result, during normal operations of the network 2, data traffic received at the router 18 will not be forwarded to the Backup link 16, which will lay dormant. However, if a primary resource failure is detected, the backup link 16 can be activated and advertised to adjacent routers 18, so that data traffic can be forwarded to the backup link 16, and so bypass the failed primary resource.

In the embodiment of FIG. 1, two backup links 16*a* and 16*b* are illustrated (shown in dashed lines), respectively connecting IR(A) 10*a* to ABR(B) 8*b*, and IR(B) 10*b* to ABR(A) 8*a*. In accordance with the present invention, each of these back-up links 16 are provisioned with a Back-up type attribute. This attribute is assigned in each of the ABRs 8*a*,8*b* and the IRs 10*a*,10*b*. Accordingly, under normal operating conditions, these links 16 are not advertised to adjacent routers 18 in LSA messages originated by any of the IRs 10*a*,10*b* or ABRs 8*a*,8*b*. Furthermore, these links 16 are not used in the calculation of OSPF routes, and thus the respective forwarding tables of each of the involved routers 8*a*,8*b*,10*a*,10*b* are not updated with information concerning the back-up links 16. As a result, no traffic is routed to these Back-up links 16, and thus these links 16 may be considered to be dormant.

However, if, for example, IR(A) 10*a* detects a loss of communications with ABR(A) 8*a* (which may be due to either failure of ABR(A) 8*a* or the link 14*a* between IR(A) 10*a* and ABR(A) 8*a*), then IR(A) 10*a* will declare a link failure concerning link 14*a*. IR(A) 10*a* will then promote the back-up link 16*a* to an active state, and negotiate a full adjacency with ABR(B) 8*b* through the promoted Back-up link 16*a*. Once the full adjacency relationship between IR(A) 10*a* and ABR(B) 8*b* has been negotiated, each of IR(A) 10*a* and ABR(B) 8*b* will flood LSAs advertising the Back-up link 16*a* as a valid route, then recalculate OSPF routes, and subsequently update their respective databases 32, so that traffic can be forwarded through the Back-up link 16*a* to by-pass the failed primary resources (i.e. link 14*a* and/or ABR(A) 8*a*).

Subsequently, if the IR(A) 10*a* detects recovery of communications with ABR(A) 8*a*, then IR(A) 10*a* will renegotiate a full adjacency with the ABR(A) 8*a*. Once this is complete, IR(A) 10*a* will demote the promoted back-up link 16*a* to an inactive state, by terminating the adjacency relationship with the ABR(B) 8*b*. Both IR(A) 10*a* and ABR(A) 8*a* will then flood LSAs advertising the recovered link between IR(A) 10*a* and ABR(A) 8*a*. The LSA flooded by IR(A) 10*a* will omit any information concerning the demoted back-up link 16*a*, so that recalculation of OSPF routes will result in purging the back-up link 16*a* from respective databases 32 of IR(C) 10*c* and IR(D) 10*d*. Similarly, ABR(B) 8*b* will flood an LSA omitting any information concerning the demoted back-up link 16*a*, so that recalculation of OSPF routes will result in purging the back-up link 16*a* from respective databases 32 of each of the IRs 10 within area 0.0.0.2 4*b*. Following recalculation of OSPF routes based on the LSAs propagated from each of IR(A) 10*a* and ABR(B) 8*b*, data traffic will no longer be forwarded to the demoted back-up link 16*a*, which will therefore revert to its dormant state.

In order to avoid rapid flopping between the primary link 14*a* and back-up link 16*a*, the IR(A) 10*a* may implement a predetermined delay period between detection of a loss of communications with ABR(A) 8*a*, declaration of link failure, and promotion of the Back-up link 16*a* to active status. This delay means that loss of communications over the primary link 14*a* must be detected for a certain (provisioned) period of time before the Back-up link 16*a* is activated, so that brief intermittent communications failures (which are comparatively common) will not trigger inappropriate activation of the Back-up link 16*a*. Similarly, a predetermined (and provisionable) delay period may be interposed between detection of recovery of communications over the primary link 14*a* and demotion of the Back-up link 16*a* to inactive status. This second delay (which may be the same or different from that of the first delay) means that recovery of communications must be detected for a certain period of time before the Back-up link 16*a* is deactivated, so that intermittent communications recovery will not trigger inappropriate deactivation of the Back-up link 16*a*.

As described above, the present invention provides back-up links 16 having a Back-up interface type attribute, which enables the back-up links 16 to remain dormant during normal operations of the network 2. These links 16 are automatically activated by an internal router 10 in response to detection of a primary network resource failure, in order to route traffic around the failed resource, and then automatically deactivated when normal network operation is restored. Consequently, the back-up links 16 only carry data traffic in an event of a network failure, and otherwise remain dormant. Thus it will be seen that the present invention provides protection against resource failures in Open Shortest Path First (OSPF) networks, without increasing the complexity of the network topology and/or management.

The embodiment(s) of the invention described above is(are) intended to be exemplary only. The scope of the invention is therefore intended to be limited solely by the scope of the appended claims.

We claim:

1. A method of protecting an Open Shortest Path First (OSPF) network against network failures affecting traffic flow between an interior router (IR) and a predetermined primary area border router (ABR) using a back-up link between the IR and a predetermined alternate ABR, the method comprising steps of:
   maintaining the back-up link in a dormant state during normal operations of the network, such that no traffic is forwarded to the back-up link during normal operations of the network; and
   activating the back-up link in response to a network failure affecting communications between the IR and the primary ABR, such that traffic can be routed between the IR and the alternate ABR through the back-up link comprising:
      detecting the network failure affecting communications between the IR and the primary ABS comprising:
         detecting a loss of communications between the IR and the primary ABR;
         monitoring a link between the IR and the primary ABR for a predetermined period, to detect recovery of communications;
         declaring a link failure if recovery of communications between the IR and the primary ABR is not detected within the predetermined period;
      promoting the back-up link to a valid status; and
      advertising the back-up as a valid route.

2. A method as claimed in claim 1, wherein the step of promoting the back-up link comprises a step of negotiating an adjacency relationship between the IR and the alternate ABR.

3. A method as claimed in claim 1, further comprising a step of deactivating the back-up link in response to a network recovery affecting communications between the IR and the primary ABR, such that traffic flow through the back-up link between the IR and the alternate ABR is terminated.

4. A method as claimed in claim 3, wherein the step of deactivating the back-up link comprises steps of:
   detecting the network recovery; and
   demoting the back-up link to an inactive status.

5. A method as claimed in claim 4, wherein the network recovery is detected by the IR.

6. A method as claimed in claim 4, wherein the step of detecting the network recovery comprises steps of:
   detecting a recovery of communications between the IR and the primary ABR;
   monitoring a link between the IR and the primary ABR for a predetermined period, to detect loss of communications; and
   declaring a link recovery if loss of communications between the IR and the primary ABR is not detected within the predetermined period.

7. A method as claimed in claim 4, wherein the step of demoting the back-up link comprises a step of terminating an adjacency relationship between the IR and the alternate ABR.

8. A method as claimed in claim 5, wherein the step of deactivating the back-up link to an inactive status is initiated by the IR.

9. A router adapted for protecting an Open Shortest Path First (OSPF) network against network failures affecting communication with a predetermined adjacent router using a back-up link predetermined alternate router, the router comprising:
   means for maintaining the back-up link to a dormant state during normal operations of the network, such that no traffic is forwarded to the back-up link during normal operations of the network; and
   means for activating the back-up link in response to a network failure affecting communications with primary router, such that traffic can be routed through the back-up link comprising:
      means for detecting the network failure affecting communications with the primary adjacent router comprising:
         means for detecting a loss of communications with the primary adjacent router;
         means for monitoring a link to the primary adjacent router for a predetermined period, to detect recovery of communications;
         means for declaring a link failure if recovery of communications with the primary adjacent is not detected within the predetermined period;
      means for promoting the back-up link to a valid status; and
      means for advertising the back-up as a valid route.

10. A router as claimed in claim 9, wherein the means for promoting the back-up link comprises means for negotiating an adjacency relationship with the alternate router.

11. A router as claimed in claim 9, further comprising means for deactivating the back-up link in response to a network recovery affecting communications with the primary adjacent router, such that traffic flow with the alternate router through the back-up link is terminated.

12. A router as claimed in claim 11, wherein the means for deactivating the back-up link comprises:
   means for detecting the network recovery; and
   means for demoting the back-up link to an inactive status.

13. A router as claimed in claim 12, wherein the means for detecting the network recovery comprises:
   means for detecting a recovery of communications with the primary adjacent router;
   means for monitoring a link to the primary adjacent router for a predetermined period, to detect loss of communications; and
   means for declaring a link recovery if loss of communications with the primary adjacent router is not detected within the predetermined period.

14. A router as claimed in claim 12, wherein the means for demoting the back-up link comprises means for terminating an adjacency relationship with the alternate adjacent router.

15. A computer-readable storage medium encoded with a software program adapted to control a router of an Open Shortest Path First (OSPF) network to protect against network failures affecting communications with a predetermined primary adjacent router using a back-up link to a predetermined alternate router, the computer-readable medium comprising:

software adapted to control the router to maintain the back-up link in a dormant state during normal operations of the network, such that no traffic is forwarded to the back-up link during normal operations of the network; and software adapted to control the router to activate the back-up link in response to a network failure affecting communication with the primary router, such that traffic can be routed through the back-up link comprising:

software adapted to control the router to detect the network failure affecting communications with the primary adjacent router comprising:

software adapted to control the router to detect a loss of communications with the primary adjacent router;

software adapted to control the router to monitor a link to the primary adjacent router for a predetermined period, to detect recovery of communications;

software adapted to control the router to declare a link failure if recovery of communications with the primary adjacent router is not detected within the predetermined period;

software adapted to control the router to promote the back-up link to an active status; and software adapted to control the router to advertise the back-up link as a valid route.

16. The computer-readable storage medium as claimed in claim 15, wherein the software adapted to control the router to promote the back-up link comprises:

software adapted to control the router to negotiate an adjacency relationship with the alternate router; and software adapted to control the router to update a respective forwarding table of the router to identify the back-up link as a valid route.

17. The computer-readable storage medium as claimed in claim 15, further comprising software adapted to control the router to deactivate the back-up link in response to a network recovery affecting communications with the primary adjacent router, such that traffic flow with the alternate router through the back-up link is terminated.

18. The computer-readable storage medium as claimed in claim 17, wherein the software adapted to control the router to deactivate the back-up link comprises:

software adapted to control the router to detect the network recovery; and software adapted to control the router to demote the back-up link to an inactive status.

19. The computer-readable storage medium as claimed in claim 18, wherein the software adapted to control the router to detect the network recovery comprises:

software adapted to control the router to detect a recovery of communications with the primary adjacent router;

software adapted to control the router to monitor a link to the primary adjacent router for a predetermined period, to detect loss of communications; and software adapted to control the router to declare a link recovery if loss of communications with the primary adjacent router is not detected within the predetermined period.

20. The computer-readable storage medium as claimed in claim 18, wherein the software adapted to control the router to demote the back-up link comprises:

software adapted to control the router to terminate an adjacency relationship with the alternate adjacent router; and software adapted to control the router to update a respective forwarding table of the router to reflect an inactive status the back-up link.

\* \* \* \* \*